United States Patent Office 3,444,401
Patented May 13, 1969

3,444,401
METHOD AND ARRANGEMENT FOR GENERATING ENERGY FROM NUCLEAR FISSION IN A HIGH TEMPERATURE REACTOR
Paul Gilli, Vienna, Austria, assignor to Waagner-Biro Aktiengesellschaft, Vienna, Austria
Filed June 26, 1967, Ser. No. 648,637
Claims priority, application Austria, June 27, 1966, A 6,122/66
Int. Cl. G21d 7/02
U.S. Cl. 310—11        16 Claims

ABSTRACT OF THE DISCLOSURE

The heated cooling gases from a high temperature reactor are used as working gas in a magneto-gas-dynamic generator and further in a gas turbine, and/or a steam generator providing steam for a steam turbine and possibly a regenerative heat exchanger. Different ways of constructing the core of the high temperature reactor with either thermionic or thermo-electric elements are shown.

Background of the invention

This invention concerns a method and an arrangement for generating energy from the nuclear fission in a high temperature reactor.

Several methods for the solution of this problem have already been proposed.

The thermionic method, which depends on the emission of electrons from a hot emitter and their subsequent passage to a colder collector, serves to generate current directly from the energy of the nuclear fission. The emitter is formed to be a casing for a fissionable fuel element, while the collector is cooled by cooling medium. A gas or steam type medium with a low ionization work function, preferably cesium at a low pressure, is introduced in the space between the emitter and the collector. This arrangement is also known as a plasmathermo element or a cesium-diode. For the thermo-electric method the fissionable fuel is surrounded with high temperature thermocouples whose hot junction is in contact with the fissionable fuel while the cold junction is cooled by the cooling medium.

The magneto-gas-dynamic method also called MGD, MHD (magneto-hydro-dynamic method), MPD (magneto-plasma-dynamic method), MFD (magneto-fluid-dynamic method) consists of conducting a partly ionized gas, for example a gas mixture consisting of inert gases with a small addition of alkali metal steam, through a strong magnetic field, thus inducing an electric current which is taken off at electrodes. The working medium, a gas or mixture of gases, may be brought to the necessary temperature in a nuclear fission reactor.

Summary of the invention

It is proposed in this invention, that, in order to obtain a high efficiency, the thermionic or thermo-electric process be combined with the magneto-gas-dynamic process. This is to be accomplished by arranging the two devices in series as far as the gas processing is concerned, so that all or a part of the fissionable elements in the core of the high temperature reactor act as thermionic or thermo-electric transducers. Furthermore, the cooling medium which cools the collector of the thermionic elements or the cold junctions of the thermocouple, after being heated in the fission zone is conducted to a magneto-gas-dynamic generator thus constituting at least part of its working medium, and thereafter to at least one heat sink, that is a heat exchanger, and at least one compressor.

Thereafter the cooling medium is conducted in full circle back to the core of the reactor. Thus a part of the heat from the energy liberated by the fission process is converted directly to electrical energy, while another part is first converted into pressure or kinetic energy and then by means of an MHD generator and in any case by means of a subsequent thermal engine into electric energy. The waste heat of the process is absorbed into the cooling medium for direct current generation (thermionic or thermo-electric process), the waste heat being changed directly into electric current in an MHD generator and in subsequent power installations (gas and steam turbines with generators).

By this series arrangement of otherwise known building blocks, a considerable increase in efficiency results, since the magneto-gas-dynamic process, which in itself has a high efficiency of approximately 40 to 50%, is herein preceded by a further high temperature process, so that for the arrangement disclosed in this invention an overall efficiency of 50 to 60% and even higher will result. Because of the higher efficiency, a decrease of the capitalization costs for a particular electric net power results in many cases, as compared to the conventional arrangement wherein the two processes are not combined.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiment

Figure 1:
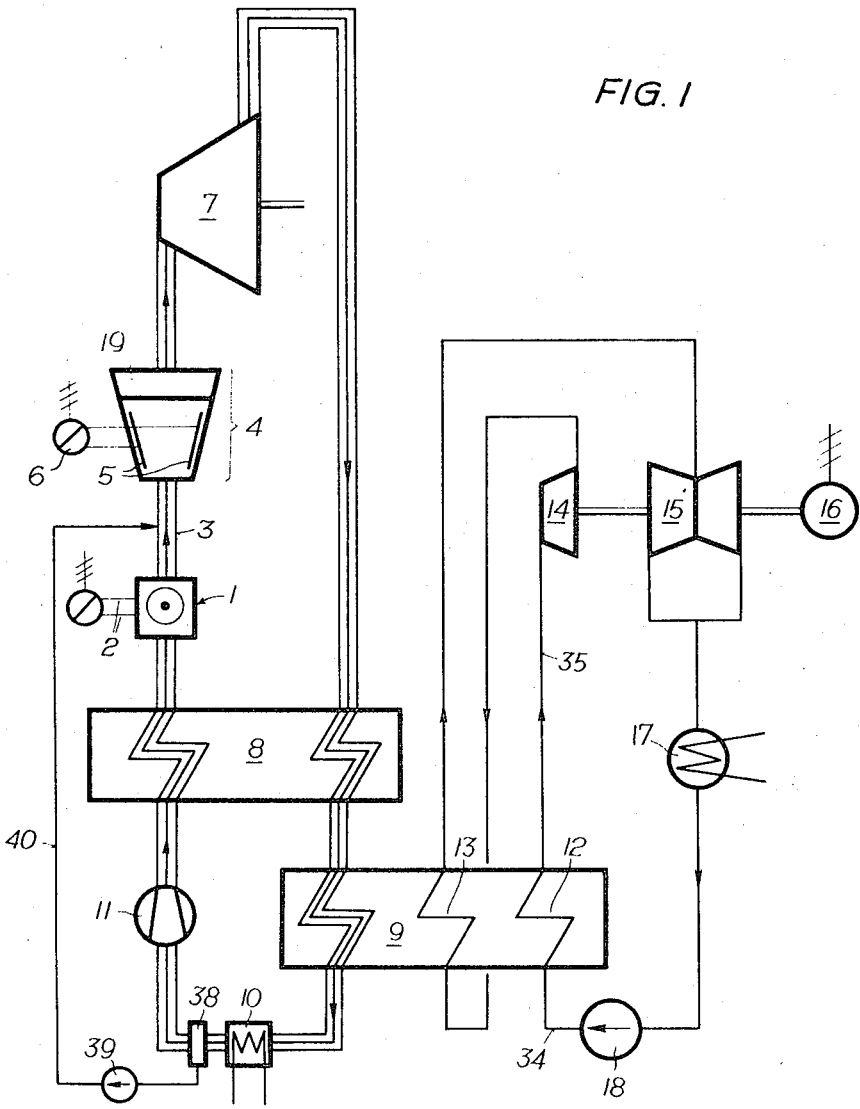
FIG. 1 is a flow sheet of an installation according to this invention.

FIG. 1 is a flow sheet of the complete arrangement. The high temperature reactor 1 is equipped with connecting cables 2 for supplying the direct current generated by means of the thermionic or thermo-electric transducers. The hot cooling gases of reactor 1 are conducted by means of the gas pipe 3 into a generator for directly generating current from the pressure or kinetic energy of the hot gases, e.g., an MHD generator 4, which is equipped with electrodes 5, from which the direct current is conducted to a direct current-alternating current inverter 6. The cooling gas, a cooling medium, flows from this generator to a diffuser 19 and from there to a gas turbine 7 where it is expanded further. The hot waste gases of the turbine 7 are conducted to a regenerative heat exchanger 8, which heats the cooling gases entering the reactor. A steam generator 9 and a pre-cooler 10 are arranged after this heat exchanger. From the pre-cooler 10 the gas flows to a compressor 11 and to the secondary side of the regenerative heat exchanger 8. From there it is returned into the reactor. When the cooling medium is an inert gas-alkali metal vapor mixture, it is advantageous to separate the alkali metal from the gas stream in liquid condition prior to the entrance into the compressor 11 and to put it back into the gas steam by means of a pump 39 and a pipe 40 after the gas stream has left the reactor. Steam generator 9 consists of a preheater, evaporator, super heater element 12 as well as a reheater element 13. The high pressure turbine 14 is connected to the high pressure part 12 of the steam generator over a steam pipe 35. The low pressure part 15 of the turbine is fed from the reheater. The waste steam is condensed in the condenser 17. The condensate is fed to the high pressure part 12 of the boiler by feed pump 18 and feed pipe. The energy generated in turbines 14 and 15 is changed into current in generator 16.

An actual installation need not actually contain all the units following the high temperature reactor 1 and the magneto-gas-dynamic generator 4. For example, only one or two of the elements consisting of the gas turbine 7, the regenerative heat exchanger 8 and the steam generator 9 need be present. Furthermore, the pre-cooler 10 may be dispensed with when a steam generator 9 is present. That is of the heat exchangers 9 and 10, at least one must be present. Which particular ones of the subsequent units are used in a particular installation depends entirely on the economic and technical considerations entailed therein.

The arrangement according to this invention results in a particularly high increase in efficiency when the entering temperature of the working gas in the reactor is relatively low, for example in the order of magnitude of 300° C. In this case, particularly low collector temperatures, or cold junction temperatures, result, and a relatively high temperature difference between the fission element and the cooling medium. This results in a high current generation in the reactor.

The low entering temperature to the reactor is accomplished by keeping the steam generator 9 and the pre-cooler 10, while either dispensing with the regenerative heat exchanger 8 or having it be a low capacity element.

Figure 2:
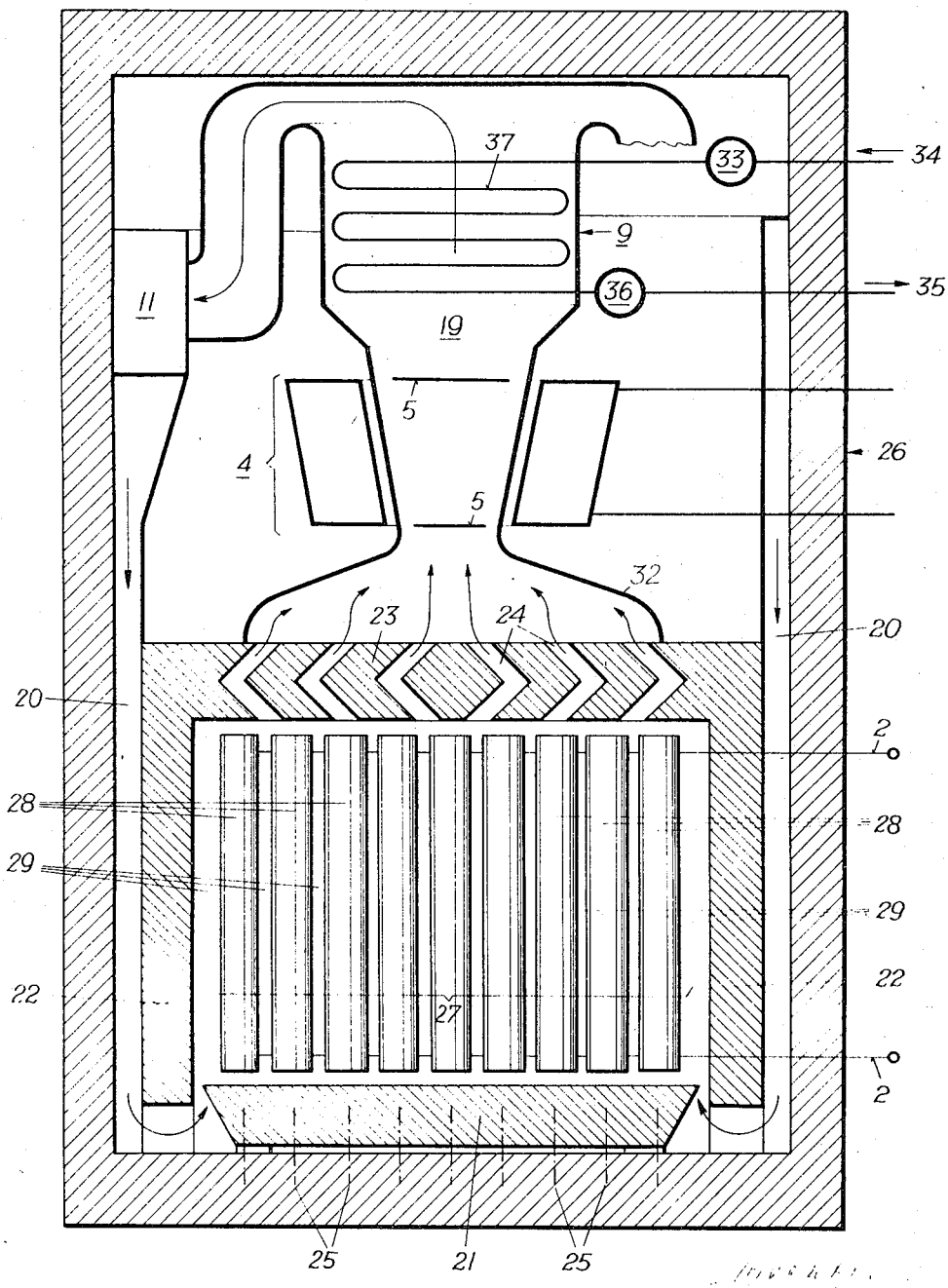
FIG. 2 shows the arrangement according to this invention in a prestressed concrete enclosure.

FIG. 2 shows a particular embodiment of the inventive idea according to FIG. 1. The same reference figures are used as in the preceding figure. The circular path of the working medium is shown in a pressure vessel 26. The fissionable fuel elements 28 are arranged in the core of the reactor 1. These serve simultaneously as direct current generators. The connecting cables 2 extend through the pressure vessel 26. Cooling channels 29 are arranged between the fissionable fuel elements 28. The cooling medium flows vertically upward through these. The pressure vessel 26 serves as a common pre-stressed concrete enclosure for the reactor 1, the MHD generator 4, the subsequent steam boiler 9, and the pressure booster arrangement 11. The cooling medium flows from the reactor 27 into the magneto-gas-dynamic generator 4 via nozzle 32. The superconducting magnets of the generator 4 are heat shielded and are kept at the low temperature by means of a cooling arrangement which is not shown and which uses liquid helium. The diffuser element 19 forms the channel to the boiler 9. The feed pipe 34 and the superheated steam pipe 35 pass through the reinforced concrete enclosure 26. The inlet header 33, the superheated steam header 36, and the steam generator pipes 37 are comprised in the boiler 9 which is constructed as a once through boiler. The working medium flows from the boiler into a compressor 11 and from there through an annular space 20 vertically downward and back into the core of the reactor. The supporting structure 21 of the core consists of a lateral neutron reflector 22 and an upper reflector 23, which also serves as a radiation shield. The working medium flows through the reflector 23 through bent slots 24 in order to avoid passage of radiation from the core into the magneto-gas-dynamic generator 4. The charge, discharge and control arrangements 25 are situated under the core.

Figure 3:
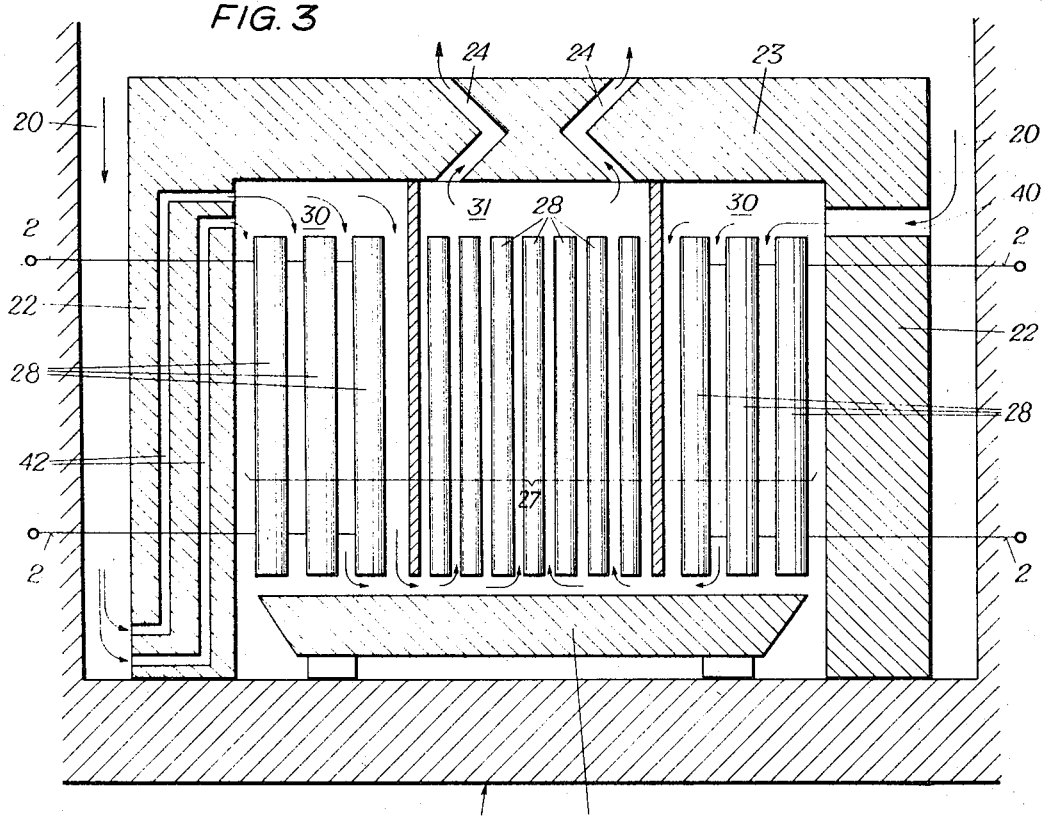
FIG. 3 shows a variation of the arrangement according to FIG. 2.

FIG. 3 shows a further embodiment of the inventive idea. The cylindrical core is subdivided into a region 30 which has substantially the form of a hollow cylinder and contains the fissionable fuel elements 28 which are thermionic elements. A central region 31 also of substantially cylindrical form has conventional fissionable fuel elements 28 without direct current generation. The working medium which comes from the compressor flows vertically downward, through the annular space 20, passes through the lateral reflector via horizontal openings as shown in the right half of FIG. 3, and then flows downward through the annular region 30 as well as upward through the central region. Thereafter, it passes through the bent slots 24 in the upper reflector 23 over the nozzle 32 into the magneto-gas-dynamic generator 4 which is not shown. The left half of FIG. 3 shows a slightly different embodiment. The working medium which comes from the compressor first flows along the lateral reflector 22, then vertically upward through channels 42 in the reflector 22, cooling the latter.

The working medium is a mixture of inert gases with a small addition of alkali metal or a fine suspension of, for example, barium oxide. The choice of additives yields sufficient ionization and with it an economically interesting power density in the magneto-gas-dynamic generator at relatively low temperatures of approximately 1000°–1500° C.

In another embodiment, which however is not shown, the fissionable fuel elements may be constructed as thermionic or thermo-electric elements over only a part of their length, starting with the side on which the working medium is admitted.

Figure 4:
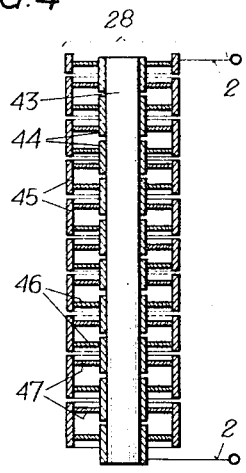
FIG. 4 shows the construction of a fissionable fuel element for the thermo-electric process.

FIG. 4 is a lengthwise sectional view of a fissionable fuel element. The direct current generation takes place according to the thermo-electric process. The central fissionable fuel rod 43 consists of uranium carbide. The hot junctions or bridges 44 rest on this rod, while the cold junctions or bridges 45 are arranged at the edge of the fissionable fuel element 28, which is surrounded by cooling medium. The single elements are connected in series along the lengthwise axis of the rod. The different materials of the thermocouple elements are numbered 46 and 47.

Figure 5:
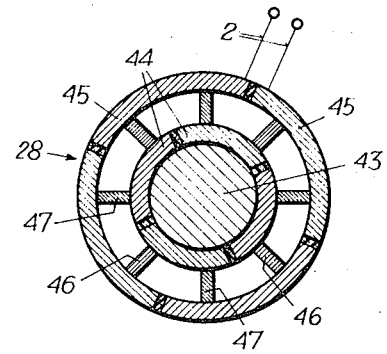
FIG. 5 is a cross-section of a fissionable fuel element for the thermo-electric process wherein the arrangement of the high temperature element is different from that of FIG. 4.

FIG. 5 is a sectional view of a fissionable fuel element 28 in which the thermocouple elements are arranged radially around the circumference. The same reference numbers as in FIG. 4 apply.

Figure 6:
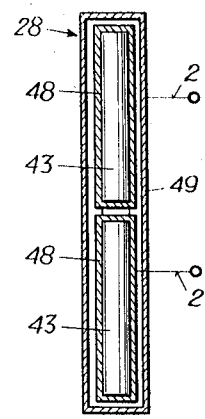
FIG. 6 shows the construction of a fissionable fuel element for the thermionic process.

FIG. 6 is a lengthwise sectional view of a fissionable fuel element of a thermionic process. The uranium carbide rod is surrounded by the jacket 48 and serves as the emitter of the element. A cable 2 is connected to the jacket 48. The second cable is connected to the collector 49. An ionized medium as for example, cesium at low pressure is introduced between the collector 49 and the emitter 48. A plurality of emitters connected in parallel may be arranged within one collector 49.

While the invention has been illustrated and described as embodied in particular arrangements utilizing the energy contained in the working gases and reintroducing the working gas to the high temperature reactor, it is not intended to be limited to the details shown, since various modifications and structural changes may be made without departing in any way from the spirit of the present invention.

What is claimed as new and desired to be protected by Letters Patent is set forth in the appended claims.

I claim:

1. An arrangement for generating energy from the nuclear fission in a high temperature reactor having a cooling medium comprising, in combination, thermionic or thermo-electric means for utilizing at least part of the nuclear fission energy in said reactor for direct current generation and generating a heated cooling medium as by-product; magneto-gas-dynamic means for utilizing the energy of said heated cooling medium for further direct current generation; turbine means driven by the heated cooling medium after the same has passed through said magneto-gas-dynamic means, compressor means for compressing said heated cooling medium after the same has passed through said turbine means, and means for reintroducing the thus compressed cooling medium into said high temperature reactor.

2. An arrangement as set forth in claim 1, comprising a regenerative heat-exchanger in the path of said heated cooling medium from said turbine means to said compressor means.

3. An arrangement as set forth in claim 2, comprising also a steam generator associated with said regenerative heat-exchanger.

4. An arrangement as set forth in claim 1 wherein said high temperature reactor comprises fissionable fuel elements; and wherein said means for utilizing at least part of the nuclear fission energy in said reactor for direct current generation comprise fissionable fuel elements constructed as thermionic elements.

5. An arrangement as set forth in claim 1 wherein said high temperature reactor comprises fissionable fuel elements; and wherein said means for utilizing at least part of the nuclear fission energy in said reactor for direct current generation comprises thermo-electric elements.

6. An arrangement as set forth in claim 1 wherein said magneto-gas-dynamic means comprise a magneto-gas-dynamic generator having a working medium, said working medium comprising, at least in part, said heated cooling medium.

7. An arrangement as set forth in claim 6 wherein said working medium comprises a mixture of inert gases with a relatively small percentage of additional alkali metal vapor.

8. An arrangement as set forth in claim 7, wherein said alkali metal vapor is cesium.

9. An arrangement as set forth in claim 7 wherein the working medium is cooled below the condensation point of said alkali metal in said further power generation means, yielding liquid alkali metal and cooling gases.

10. An arrangement as set forth in claim 9 wherein said liquid alkali metal is separated from said working medium prior to entry into said high temperature reactor, said inert gases then constituting said cooling medium; and wherein said liquid alkali metal is re-added to said cooling medium, forming said working medium for said magneto-gas-dynamic generator, prior to entry into said generator.

11. An arrangement as set forth in claim 6 wherein said working medium for said magneto-gas-dynamic generator comprises a suspension of fine dust in an inert gas.

12. An arrangement as set forth in claim 4 wherein only part of the length of said fissionable fuel elements is utilized as thermionic elements.

13. An arrangement as set forth in claim 5 wherein only part of the length of said fissionable fuel elements is utilized as thermo-electric elements.

14. An arrangement as set forth in claim 12 wherein that part of the length of said fissionable fuel elements used as thermionic elements comprises that part of the length on the inlet side of said cooling gases.

15. An arrangement as set forth in claim 1, wherein said reactor has a core having a first cylindrical region; and a second coaxial cylindrical region, said means for utilizing at least part of the nuclear fission energy for direct current generation being located in said first region; and wherein said cooling medium passes first through said first region and then through said second region.

16. An arrangement for generating energy from the nuclear fission in a high temperature reactor having a cooling medium, said cooling medium becoming heated during said nuclear fission process, comprising, in combination, thermionic or thermo-electric elements located within said nuclear reactor, for direct current generation; a magneto-gas-dynamic generator adapted to use the energy of said heated cooling medium for further direct current generation; gas turbine for further utilizing the energy in said heated cooling medium after said heated cooling medium has passed through said magneto-gas-dynamic generator; a regenerative heat exchanger adapted to further cool said heated cooling medium for additional power generation connected after said gas turbine in the direction of flow of said heated cooling medium; a steam generator adapted to drive a turbine, by utilization of the energy contained in said heated cooling medium, connected after said regenerative heat exchanger in the direction of flow of said cooling medium; and compressor means adapted to compress said cooling medium prior to reentry into said high temperature reactor.

References Cited

UNITED STATES PATENTS

| | | | |
|---|---|---|---|
| 3,113,091 | 12/1963 | Rasor et al. | 176—39 X |
| 3,140,411 | 7/1964 | Oickle et al. | 176—39 X |
| 3,149,248 | 9/1964 | Valfels | 176—39 X |
| 3,201,619 | 8/1965 | Gleason et al. | 176—39 X |
| 3,211,586 | 10/1965 | McCoy et al. | 176—39 X |
| 3,234,412 | 2/1966 | Sankovich et al. | 176—39 X |
| 3,283,183 | 11/1966 | Yano et al. | 310—11 |
| 3,320,444 | 5/1967 | Prem | 310—11 |

FOREIGN PATENTS 1,417,834 12/1964 France.

REUBEN EPSTEIN, *Primary Examiner.*

U.S. Cl. X.R.

136—202; 176—39; 310—4